United States Patent
Chai et al.

(10) Patent No.: US 10,278,220 B2
(45) Date of Patent: Apr. 30, 2019

(54) CONTENT PUBLISHING METHOD AND USER EQUIPMENT

(71) Applicant: Huawei Technologies Co., Ltd., Shenzhen (CN)

(72) Inventors: Li Chai, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 15/286,132

(22) Filed: Oct. 5, 2016

(65) Prior Publication Data

US 2017/0027012 A1 Jan. 26, 2017

Related U.S. Application Data

(63) Continuation of application No. 14/228,882, filed on Mar. 28, 2014, now Pat. No. 9,485,796, which is a (Continued)

(30) Foreign Application Priority Data

Sep. 30, 2011 (CN) .......................... 2011 1 0297621

(51) Int. Cl.
*H04W 76/14* (2018.01)
*H04W 48/10* (2009.01)

(52) U.S. Cl.
CPC .......... *H04W 76/14* (2018.02); *H04W 48/10* (2013.01)

(58) Field of Classification Search
CPC .... H04W 76/14; H04W 72/005; H04W 48/10
See application file for complete search history.

(56) References Cited

U.S. PATENT DOCUMENTS

2003/0135552 A1 7/2003 Blackstock et al.
2005/0033806 A1 2/2005 Harvey et al.
(Continued)

FOREIGN PATENT DOCUMENTS

CN 101772199 A 7/2010
CN 102090132 A 6/2011
(Continued)

OTHER PUBLICATIONS

3rd Generational Partnership Project; Technical Specification Group Radio Access Network; Evolved Universal Terrestrial Radio Access (E-UTRA); Radio Resource Control (RRC); Protocol specification (Release 10) 3GPP TS 36.331 V10.3.0 (Sep. 2011), 296 pages.
(Continued)

*Primary Examiner* — Jenee Holland
(74) *Attorney, Agent, or Firm* — Slater Matsil, LLP

(57) ABSTRACT

Embodiments of the present invention provide a content publishing method and a user equipment. The content publishing method includes: obtaining, by a first user equipment supporting a D2D function, a resource for broadcasting information of the first user equipment. The method also includes broadcasting, by the first user equipment, the information of the first user equipment on the obtained resource, so that a second user equipment obtains and sends the information of the first user equipment to a network-side device to set up a connection with the first user equipment, where the second user equipment supports the D2D function and is matched with the first user equipment.

18 Claims, 6 Drawing Sheets

Related U.S. Application Data continuation of application No. PCT/CN2012/082575, filed on Oct. 8, 2012.

(56) References Cited

U.S. PATENT DOCUMENTS

| | | | |
|---|---|---|---|
| 2005/0135305 A1* | 6/2005 | Wentink | H04B 7/2126 370/329 |
| 2006/0084444 A1* | 4/2006 | Kossi | H04W 84/18 455/450 |
| 2007/0211677 A1 | 9/2007 | Laroia et al. | |
| 2007/0211678 A1* | 9/2007 | Li | H04L 5/0035 370/338 |
| 2008/0200125 A1* | 8/2008 | Caldwell | H04B 1/034 455/42 |
| 2008/0214233 A1 | 9/2008 | Wilson et al. | |
| 2008/0288580 A1 | 11/2008 | Wang et al. | |
| 2009/0011770 A1 | 1/2009 | Jung et al. | |
| 2009/0017797 A1 | 1/2009 | Li et al. | |
| 2009/0017855 A1* | 1/2009 | Kwon | H04W 76/14 455/509 |
| 2009/0019168 A1 | 1/2009 | Wu et al. | |
| 2010/0009675 A1* | 1/2010 | Wijting | H04W 76/14 455/426.1 |
| 2010/0040029 A1 | 2/2010 | Doppler et al. | |
| 2010/0061334 A1 | 3/2010 | Gault et al. | |
| 2010/0093364 A1 | 4/2010 | Ribeiro et al. | |
| 2010/0261469 A1 | 10/2010 | Ribeiro et al. | |
| 2011/0080869 A1 | 4/2011 | Walton et al. | |
| 2011/0106837 A1 | 5/2011 | Walton et al. | |
| 2011/0106952 A1 | 5/2011 | Doppler et al. | |
| 2011/0117907 A1 | 5/2011 | Hooli et al. | |
| 2011/0153773 A1* | 6/2011 | Vandwalle | H04W 48/08 709/217 |
| 2011/0223953 A1 | 9/2011 | Lee et al. | |
| 2011/0268004 A1* | 11/2011 | Doppler | H04W 72/02 370/311 |
| 2011/0282989 A1* | 11/2011 | Geirhofer | H04W 8/005 709/224 |
| 2011/0306349 A1* | 12/2011 | Hakola | H04W 28/04 455/450 |
| 2011/0312331 A1 | 12/2011 | Hakola et al. | |
| 2011/0317569 A1 | 12/2011 | Kneckt et al. | |
| 2012/0028672 A1 | 2/2012 | Chen et al. | |
| 2012/0106517 A1 | 5/2012 | Charbit et al. | |
| 2012/0243431 A1 | 9/2012 | Chen et al. | |
| 2012/0322484 A1* | 12/2012 | Yu | H04W 4/08 455/509 |
| 2013/0010767 A1* | 1/2013 | Wang | H04W 72/005 370/336 |
| 2013/0065585 A1* | 3/2013 | Pelletier | H04W 4/02 455/435.1 |
| 2013/0109301 A1* | 5/2013 | Hakola | H04W 76/14 455/39 |
| 2013/0288608 A1* | 10/2013 | Fwu | H04W 72/02 455/63.1 |
| 2013/0301420 A1* | 11/2013 | Zhang | H04W 4/90 370/241 |
| 2013/0308549 A1* | 11/2013 | Madan | H04W 28/26 370/329 |
| 2014/0036792 A1* | 2/2014 | Li | H04W 4/70 370/329 |
| 2014/0092885 A1* | 4/2014 | Venkatachalam | H04W 76/14 370/338 |
| 2014/0307642 A1* | 10/2014 | Wanstedt | H04W 72/1289 370/329 |
| 2016/0242152 A1* | 8/2016 | Yu | H04W 76/14 |

FOREIGN PATENT DOCUMENTS

| | | |
|---|---|---|
| CN | 102172093 A | 8/2011 |
| EP | 1494394 A1 | 1/2005 |
| JP | 2005341300 A | 12/2005 |
| JP | 2010533452 A | 10/2010 |
| WO | 9834428 A2 | 8/1998 |
| WO | 2005122461 A1 | 12/2005 |
| WO | 2006134562 A2 | 12/2006 |
| WO | 2008112497 A1 | 9/2008 |
| WO | 2010049801 A1 | 5/2010 |
| WO | 2010078271 A2 | 7/2010 |
| WO | 2010082114 A1 | 7/2010 |
| WO | 2010102668 A1 | 9/2010 |
| WO | 2010125427 A1 | 11/2010 |
| WO | 2011039718 A1 | 4/2011 |
| WO | 2011109027 A1 | 9/2011 |
| WO | 2011109941 A1 | 9/2011 |

OTHER PUBLICATIONS

3rd Generational Partnership Project; Technical Specification Group Radio Access Network; Evolved Universal Terrestrial Radio Access Network (E-UTRAN); S1 Application Protocol (S1AP) (Release 10), 3GPP TS 36.413, V10.3.0 (Sep. 2011), 254 pages.

3rd Generation Partnership Project; Technical Specification Group Radio Access Network; Evolved Universal Terrestrial Radio Access (E-UTRA); Physical layer procedures (Release 10), 3GPP TS 36.213 V10.3.0 (Sep. 2011), 122 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); 3GPP TS 36.300 V10.5.0 (Sep. 2011), 194 pages.

3rd Generation Partnership Project; Technical Specification Group Radio Access Network; Evolved Universal Terrestrial Radio Access (E-UTRA); Radio Resource Control (RRC); Protocol specification (Release 10); 3GPP TS 36.331 V10.2.0 (Jun. 2011), 294 pages.

* cited by examiner

CONTENT PUBLISHING METHOD AND USER EQUIPMENT

CROSS-REFERENCE TO RELATED APPLICATIONS

This application is a continuation of U.S. patent application Ser. No. 14/228,882, filed on Mar. 28, 2014, which is a continuation of International Application No. PCT/CN2012/082575, filed on Oct. 8, 2012. The International Application claims priority to Chinese Patent Application No. 201110297621.7, filed on Sep. 30, 2011. All of the aforementioned patent applications are hereby incorporated by reference in their entireties.

TECHNICAL FIELD

Embodiments of the present invention relate to the field of communications technologies, and in particular, to a content publishing method and a user equipment.

BACKGROUND

A device to device (D2D) communications technology may implement services and data applications in a local self-organizing (ad-hoc) network and short-range communication.

To improve spectrum utilization, a D2D system and a cellular system share same resources. To access the cellular system, a D2D terminal in the D2D system needs to comply with the time and timeslot of the cellular system. The D2D system may support services such as information sharing, gaming, social services, mobile advertising, and so on.

The D2D terminal in the D2D system has a function of sensing radio resources, that is, the D2D terminal actively senses an external environment, and actively manages and configures resources according to a sensed result, not requiring control and allocation of an evolved packet core network (EPC) or an evolved universal mobile telecommunications system terrestrial radio access network (E-UTRAN), and with no authentication and certification of an operator network, which is unfavorable for proper allocation of resources and secure operation of a network. In addition, in a content publishing aspect, it is impossible to solve problems about how a matched terminal obtains quality of service (QoS) information and how guaranteed services can be provided.

SUMMARY

Embodiments of the present invention provide a content publishing method and a user equipment, so that a matched terminal can obtain QoS information, and guaranteed services can be provided for device to device (D2D) communication.

An embodiment of the present invention provides a content publishing method. A first user equipment supporting a D2D function obtains a resource for broadcasting information of the first user equipment. The information of the first user equipment includes one or a combination of an identifier, service information, a service code, and application layer service information of the first user equipment. The first user equipment broadcasts the information of the first user equipment on the obtained resource, so that a second user equipment supporting the D2D function obtains the information of the first user equipment. After being matched with the first user equipment successfully, the first user equipment sends the information of the first user equipment to a network-side device to set up a connection with the first user equipment.

An embodiment of the present invention further provides a first user equipment that supports a device to device D2D function. An obtaining module is configured to obtain a resource for broadcasting information of the first user equipment. The information of the first user equipment includes one or a combination of an identifier, service information, a service code, and application layer service information of the first user equipment. A broadcasting module is configured to broadcast the information of the first user equipment on the resource obtained by the obtaining module, so that a second user equipment supporting the D2D function obtains the information of the first user equipment. After being matched with the first user equipment successfully, the broadcasting module is configured to send the information of the first user equipment to a network-side device to set up a connection with the first user equipment.

In the embodiments of the present invention, after a first user equipment supporting a D2D function obtains a resource for broadcasting information of the first user equipment, the first user equipment broadcasts the information of the first user equipment on the obtained resource. The information of the first user equipment includes one or a combination of an identifier, service information, a service code, and application layer service information of the first user equipment. Then a second user equipment supporting the D2D function may obtain the information of the first user equipment and after being matched with the first user equipment successfully, send the information of the first user equipment to a network-side device to set up a connection with the first user equipment. In this way, a matched terminal can obtain QoS information, and guaranteed services can be provided for D2D communication.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
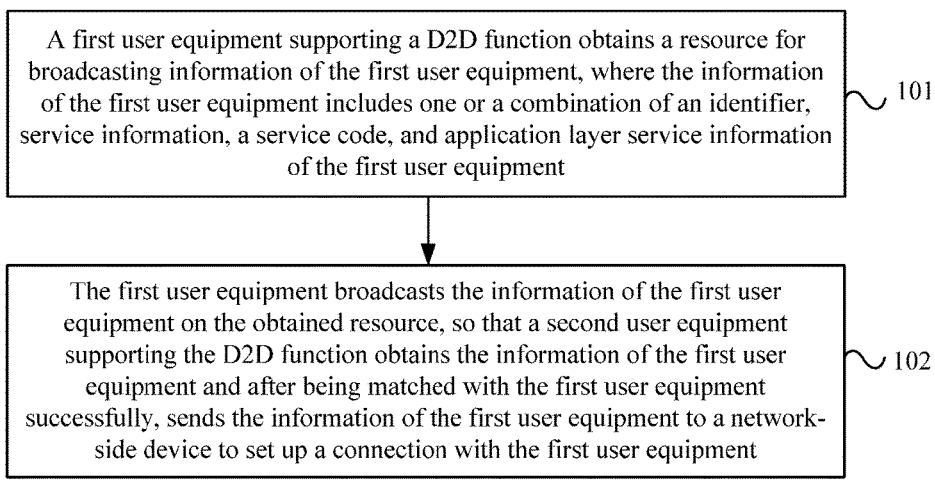
FIG. 1 is a flowchart of an embodiment of a content publishing method according to the present invention.

FIG. 1 is a flowchart of an embodiment of a content publishing method according to the present invention. As shown in FIG. 1, the content publishing method may include the following steps.

Step 101: A first user equipment supporting a D2D function obtains a resource for broadcasting information of the first user equipment, where the information of the first user equipment includes one or a combination of an identifier, service information, a service code, and application layer service information of the first user equipment.

The identifier may be: one or a combination of a physical identifier, a non-access stratum identifier (NAS ID), and an access stratum identifier (AS ID). For example, the physical identifier may be a specific code sequence such as an international mobile subscriber identity (IMSI). The NAS ID may be a serving temporary mobile subscriber identity (s-TMSI) or an old GUTI. The AS ID may be a cell radio network temporary identifier (C-RNTI) or a D-RNTI (namely, a radio network temporary identifier (RNTI) used for D2D).

The application layer service information includes service information that a user may understand. The service information that the user may understand includes a service type and/or service content. For example, the service content may be advertisement information, a video of a movie, or a game, and so on.

The service code may be a character, a character string, or a digit sequence, and may represent application layer service information.

The service information may be non-access stratum (NAS) information required by the user equipment for constructing a connection setup request message of a service, and include QoS information and so on.

Step 102: The first user equipment broadcasts the information of the first user equipment on the obtained resource, so that a second user equipment supporting the D2D function obtains the information of the first user equipment and after being matched with the first user equipment successfully, sends the information of the first user equipment to a network-side device to set up a connection with the first user equipment.

Specifically, the broadcasting, by the first user equipment, the information of the first user equipment on the obtained resource, may be: broadcasting, by the first user equipment, the information of the first user equipment on the obtained resource periodically in a discontinuous transmission mode.

In an implementation manner of this embodiment, the obtaining, by a first user equipment supporting a D2D function, a resource for broadcasting information of the first user equipment, may be: obtaining, by the first user equipment, resources that are allocated in advance by a serving base station of a cell where the first user equipment is currently located to user equipments supporting the D2D function in the cell and are used for broadcasting the information of the user equipments, where the resources are broadcast by the serving base station through a broadcast message; and selecting, by the first user equipment by automatic search or measurement, a resource whose interference level is lower than a predetermined threshold, from the resources allocated in advance by the serving base station. Optionally, the allocation manner of the serving base station is semi-static.

In another implementation manner of this embodiment, the obtaining, by a first user equipment supporting a D2D function, a resource for broadcasting information of the first user equipment, may be: selecting, by the first user equipment according to interference levels of sub-resources and position information of the sub-resources that are broadcast by a serving base station of a cell where the first user equipment is currently located, a sub-resource whose interference level is lower than a predetermined threshold, from the sub-resources broadcast by the serving base station, where the sub-resources are obtained after the serving base station divides resources that are allocated in advance by the serving base station to user equipments supporting the D2D function in the cell and are used for broadcasting the information of the user equipments.

In another implementation manner of this embodiment, the obtaining, by a first user equipment supporting a D2D function, a resource for broadcasting information of the first user equipment, may be setting up, by the first user equipment, a connection with a serving base station of a cell where the first user equipment is currently located, and triggering the serving base station to allocate a resource to the first user equipment to broadcast the information of the first user equipment. Specifically, the setting up, by the first user equipment, a connection with a serving base station of a cell where the first user equipment is currently located, may be: sending, by the first user equipment, a radio resource control connection setup message or a radio resource control connection setup complete message to the serving base station, where the radio resource control connection setup message or the radio resource control connection setup complete message carries an information element indicating that the first user equipment supports the D2D function, and/or a value of a setup cause information element in the radio resource control connection setup message is D2D connection or D2D content publishing.

Further, after the first user equipment sets up the connection with the serving base station of the cell where the first user equipment is currently located, the first user equipment may maintain a common connected state or a long discontinuous reception mode in a connected state; in addition, before the first user equipment leaves the cell, the first user equipment may notify the serving base station of recycling the resource that is allocated to the first user equipment and used for broadcasting the information of the first user equipment.

In this implementation manner, in the process of setting up, by the first user equipment, the connection with the serving base station of the cell where the first user equipment is currently located, the first user equipment may further send the service information of the first user equipment, or the service information and application layer service information of the first user equipment, or the service information and service code of the first user equipment, or the service information, application layer service information, and service code of the first user equipment to the serving base station or an evolved packet core network (EPC) entity device. In this case, if the information broadcast by the first user equipment includes the application layer service information and/or service code of the first user equipment, but does not include the service information of the first user equipment, the second user equipment may send the application layer service information and/or service code of the first user equipment to the serving base station or the EPC entity device, receive the service information of the first user equipment that is sent by the serving base station or the EPC entity device according to the application layer service information and/or service code of the first user equipment, generate a non-access stratum message according to the service information of the first user equipment, and send the non-access stratum message to a network-side device to set up a connection with the first user equipment.

Alternatively, the second user equipment may send a connection setup request message to the serving base station, where the connection setup request message carries the application layer service information and/or service code of the first user equipment, so that after receiving the connection setup request message sent by the second user equipment, the serving base station obtains the service information of the first user equipment locally or from the EPC entity device according to the application layer service information and/or service code of the first user equipment carried in the connection setup request message, adds the service information of the first user equipment to the connection setup request message sent by the second user equipment, and sends the connection setup request message to a core network device after the service information of the first user equipment is added.

In an implementation manner of this embodiment, sending the information of the first user equipment to a network-side device to set up a connection with the first user equipment may be: when the information broadcast by the first user equipment includes the service information of the first user equipment, generating, by the second user equipment, a non-access stratum message according to the service information of the first user equipment, and sending the non-access stratum message to the network-side device to set up a connection with the first user equipment.

In another implementation manner of this embodiment, before the first user equipment broadcasts the information of the first user equipment on the obtained resource, the first user equipment may further send the application layer service information of the first user equipment to a service management server, and receive the service information corresponding to the first user equipment and the service code allocated by the service management server to the first user equipment, where the service information is found by the service management server according to the application layer service information of the first user equipment. In this case, the sending the information of the first user equipment to the network-side device to set up the connection with the first user equipment may be: when the information broadcast by the first user equipment includes the application layer service information and/or service code of the first user equipment, but does not include the service information of the first user equipment, the second user equipment sends the application layer service information and/or service code of the first user equipment to the service management server, receives the service information of the first user equipment sent by the service management server according to the application layer service information and/or service code of the first user equipment, generates a non-access stratum message according to the service information of the first user equipment, and sends the non-access stratum message to the network-side device to set up a connection with the first user equipment.

In this embodiment, the cell where the first user equipment is currently located includes a target cell to which the first user equipment is handed over, or a cell where the first user equipment is powered on.

In the above embodiment, after the first user equipment supporting the D2D function obtains the resource for broadcasting the information of the first user equipment, the first user equipment broadcasts the information of the first user equipment on the obtained resource, where the information of the first user equipment includes one or a combination of an identifier, service information, a service code, and application layer service information of the first user equipment; and then a second user equipment supporting the D2D function may obtain the information of the first user equipment and after being matched with the first user equipment successfully, send the information of the first user equipment to a network-side device to set up a connection with the first user equipment. In this way, a matched terminal can obtain QoS information, and guaranteed services can be provided for D2D communication.

Figure 2:
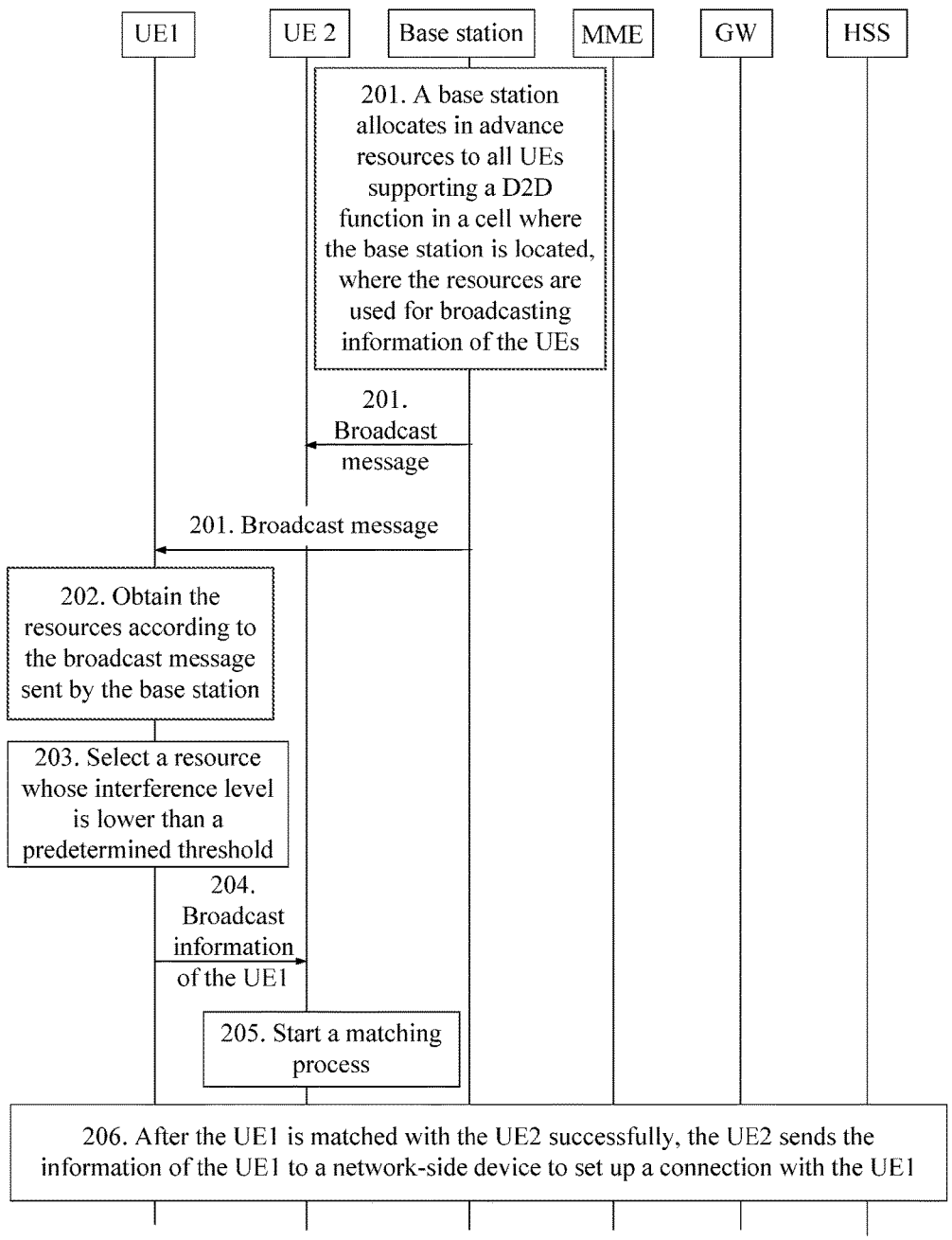
FIG. 2 is a flowchart of another embodiment of a content publishing method according to the present invention.

FIG. 2 is a flowchart of another embodiment of a content publishing method according to the present invention. As shown in FIG. 2, the content publishing method may include the following steps.

Step 201: A base station allocates in advance resources to all UEs supporting a D2D function in a cell where the base station is located, where the resources are used for broadcasting information of the UEs, and broadcasts the resources through a broadcast message.

In this embodiment, the base station may be an evolved NodeB (eNB). Definitely, the embodiment of the present invention is not limited thereto. The embodiment of the present invention does not limit the form of the base station. The information includes one or a combination of an identifier, service information, a service code, and application layer service information of the UE supporting the D2D function.

The identifier may be: one or a combination of a physical identifier, a NAS ID, and an AS ID. For example, the physical identifier may be a specific code sequence such as an IMSI; the NAS ID may be an s-TMSI or an old GUTI; and the AS ID may be a C-RNTI or a D-RNTI (namely, an RNTI used for D2D).

The application layer service information includes service information that a user may understand. The service information that the user may understand includes a service type and/or service content. For example, the service content may be advertisement information, a video of a movie, or a game, and so on.

The service code may be a character, a character string, or a digit sequence, and may represent application layer service information.

The service information may be NAS information required by a UE for constructing a connection setup request message of a service, and include QoS information and so on.

Step 202: When a UE 1 supporting the D2D function is handed over to the cell where the base station is located, or powered on in the cell where the base station is located, the UE 1 obtains the resources according to the broadcast message sent by the base station.

In this embodiment, when the UE 1 supporting the D2D function is handed over to the cell where the base station is located, or powered on in the cell where the base station is located, the UE 1 may receive the broadcast message sent by the base station. The UE 1 may obtain, according to the broadcast message, the resources that are allocated in advance by the base station to all D2D UEs in the cell where the base station is located, where the resources are used for broadcasting information of the UEs.

Step 203: The UE 1 selects by automatic search or measurement, a resource whose interference level is lower than a predetermined threshold, from the resources allocated in advance by the base station, thereby avoiding interference from other UEs supporting the D2D function or interference to other UEs supporting the D2D function.

In this case, on the Uu interface, a radio resource control idle (RRC_Idle) state is maintained between the UE 1 and the base station.

Step 204: The UE 1 broadcasts information of the UE 1 on the selected resource.

In this embodiment, the information of the UE 1 broadcast by the UE 1 is not further described herein. For details, reference may be made to the example in step 201.

Specifically, the UE supporting the D2D function has discontinuous reception (DRX) and discontinuous transmission (DTX) features.

Therefore, in this embodiment, the manner of broadcasting information of the UE 1 by the UE 1 may be a DTX manner: broadcasting information of the UE 1 on the selected resource in a discontinuous transmission cycle (DTX-Cycle).

In this embodiment, after the UE 1 broadcasts the information of the UE 1, other UEs supporting the D2D function than the UE 1 in the cell where the UE 1 is located have an opportunity to detect the UE 1.

Step 205: When a UE 2 supporting the D2D function in the cell where the UE 1 is located knows, by using a sensing technology or by searching for and measuring other UEs supporting the D2D function than the UE 2 in the cell, that a possible matched UE 1 exists, a matching process is started.

Specifically, the UE 2 may search, in the DRX manner, for information broadcast by other UEs supporting the D2D function than the UE 2 in the cell where the UE 2 is located, on some specific resources, and after knowing that a possible matched UE 1 exists, receive information of the UE 1 broadcast by the UE 1; or the UE 2 may also receive, in an event trigger manner, information of the UE 1 broadcast by the UE 1, for example, when a user has a specific requirement, a receiving action is triggered through a man-machine interface; or an application layer triggers a receiving action according to a requirement profile (profile) previously customized by the user. Definitely, the UE 2 may also receive, by using a combination of the DRX and event trigger manners, the information of the UE 1 broadcast by the UE 1.

Step 206: After the UE 1 is matched with the UE 2 successfully, the UE 2 sends the information of the UE 1 to a network-side device to set up a connection with the UE 1.

Specifically, in an implementation manner of this embodiment, when the information of the UE 1 broadcast by the UE 1 includes service information of the UE 1, the UE 2 may generate a NAS message according to the service information of the UE 1, and send the NAS message to the network-side device to set up a connection with the UE 1.

In another implementation manner of this embodiment, before step 204, the UE 1 may send the application layer service information of the UE 1 to a service management server, and receive the service information corresponding to the UE 1 and the service code allocated by the service management server to the UE 1, where the service information is found by the service management server according to the application layer service information of the UE 1. When the information broadcast by the UE 1 includes the application layer service information and/or service code of the UE 1, but does not include the service information of the UE 1, the UE 2 may send the application layer service information and/or service code of the UE 1 to the service management server, receive the service information of the UE 1 sent by the service management server according to the application layer service information and/or service code of the UE 1, generate a NAS message according to the service information of the UE 1, and send the NAS message to the network-side device to set up a connection with the UE 1.

According to the above embodiment, a matched terminal can obtain QoS information, and guaranteed services can be provided for D2D communication.

Figure 3:
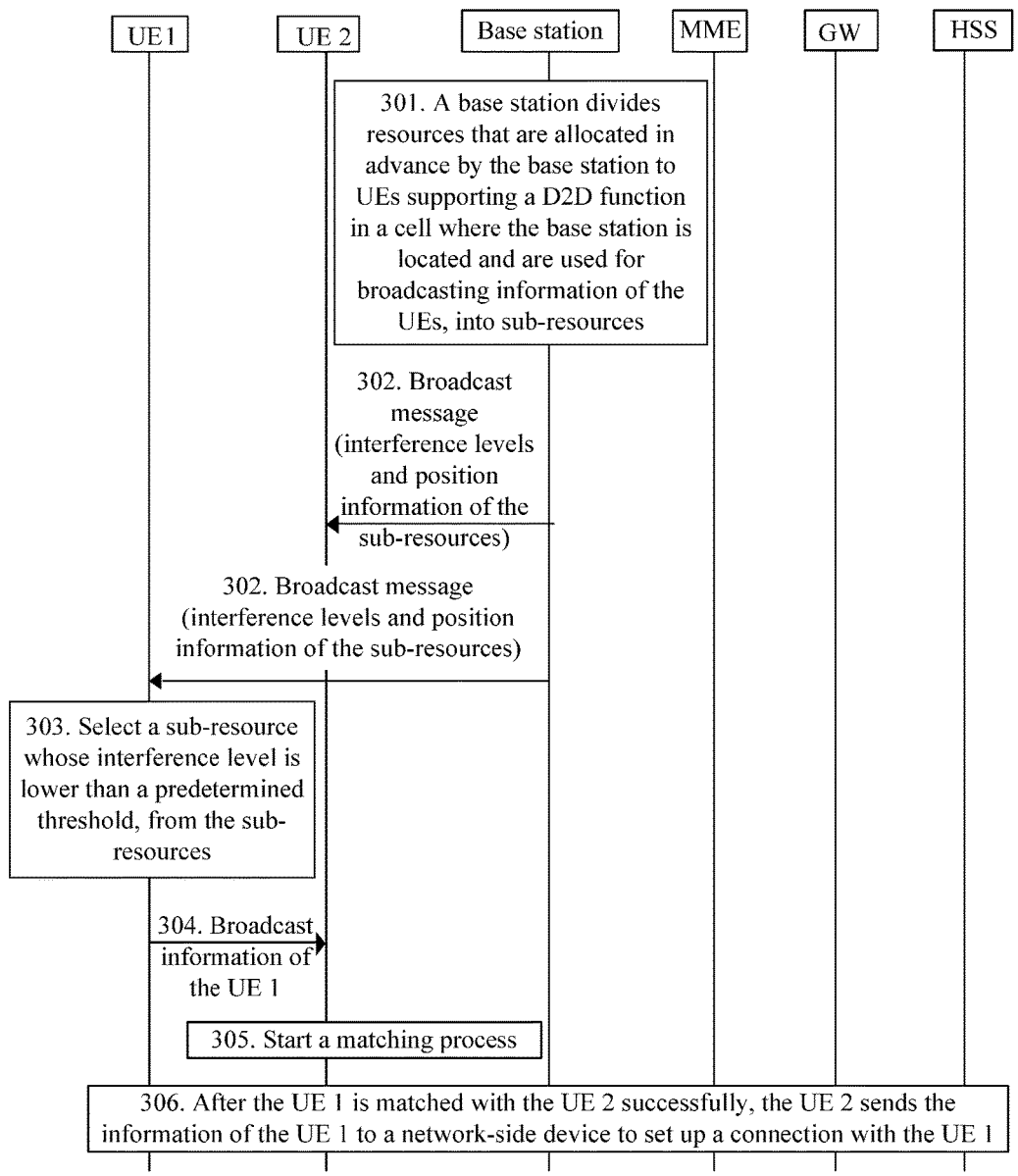
FIG. 3 is a flowchart of another embodiment of a content publishing method according to the present invention.

FIG. 3 is a flowchart of another embodiment of a content publishing method according to the present invention. As shown in FIG. 3, the content publishing method may include the following steps.

Step 301: A base station divides resources that are allocated in advance by the base station to UEs supporting a D2D function in a cell where the base station is located and are used for broadcasting information of the UEs, into sub-resources.

In this embodiment, the base station may be an eNB. Definitely, the embodiment of the present invention is not limited thereto. The embodiment of the present invention does not limit the form of the base station. The information includes one or a combination of an identifier, service information, a service code, and application layer service information of the UEs supporting the D2D function.

The identifier may be: one or a combination of a physical identifier, a NAS ID, and an AS ID. For example, the physical identifier may be a specific code sequence such as an IMSI; the NAS ID may be an s-TMSI or an old GUTI; and the AS ID may be a C-RNTI or a D-RNTI (namely, an RNTI used for D2D).

The application layer service information includes service information that a user may understand. The service information that the user may understand includes a service type and/or service content. For example, the service content may be advertisement information, a video of a movie, or a game, and so on.

The service code may be a character, a character string, or a digit sequence, and may represent application layer service information.

The service information may be NAS information required by a UE for constructing a connection setup request message of a service, and include QoS information and so on.

Specifically, the base station may divide the resources into sub-resources according to the granularity of a time domain, frequency domain, and/or space domain.

Step 302: The base station broadcasts interference levels of the sub-resources and position information of the sub-resources through a broadcast message.

In this embodiment, the base station may update the interference levels and position information of the sub-resources according to the information measured and reported by UEs in the cell where the base station is located.

Step 303: When a UE 1 supporting the D2D function is handed over to the cell where the base station is located, or powered on in the cell where the base station is located, the UE 1 selects a sub-resource whose interference level is lower than a predetermined threshold, from the sub-resources.

Specifically, when the UE 1 supporting the D2D function is handed over to the cell where the base station is located, or powered on in the cell where the base station is located, the UE 1 may receive a broadcast message sent by the base station, and further the UE 1 may read interference levels and position information of sub-resources in the broadcast message. Then the UE 1 may select, according to the interference levels and position information of the sub-resources in the broadcast message, a sub-resource whose interference level is lower than a predetermined threshold, thereby avoiding interference from other UEs supporting the D2D function or interference to other UEs supporting the D2D function. For example, assuming that the interference levels of the sub-resources divided by the base station include three levels: high, medium, and low, the UE 1 may select a sub-resource whose interference level is medium or low, that is, select the sub-resource whose interference level is lower than the high level.

In this case, on the Uu interface, a radio resource control idle (Radio Resource Control Idle, RRC_Idle for short below) state is maintained between the UE 1 and the base station.

Step 304 to step 306 are the same as step 204 to step 206, and are not further described herein.

According to the above embodiment, a matched terminal can obtain QoS information, and guaranteed services can be provided for D2D communication.

Figure 4:
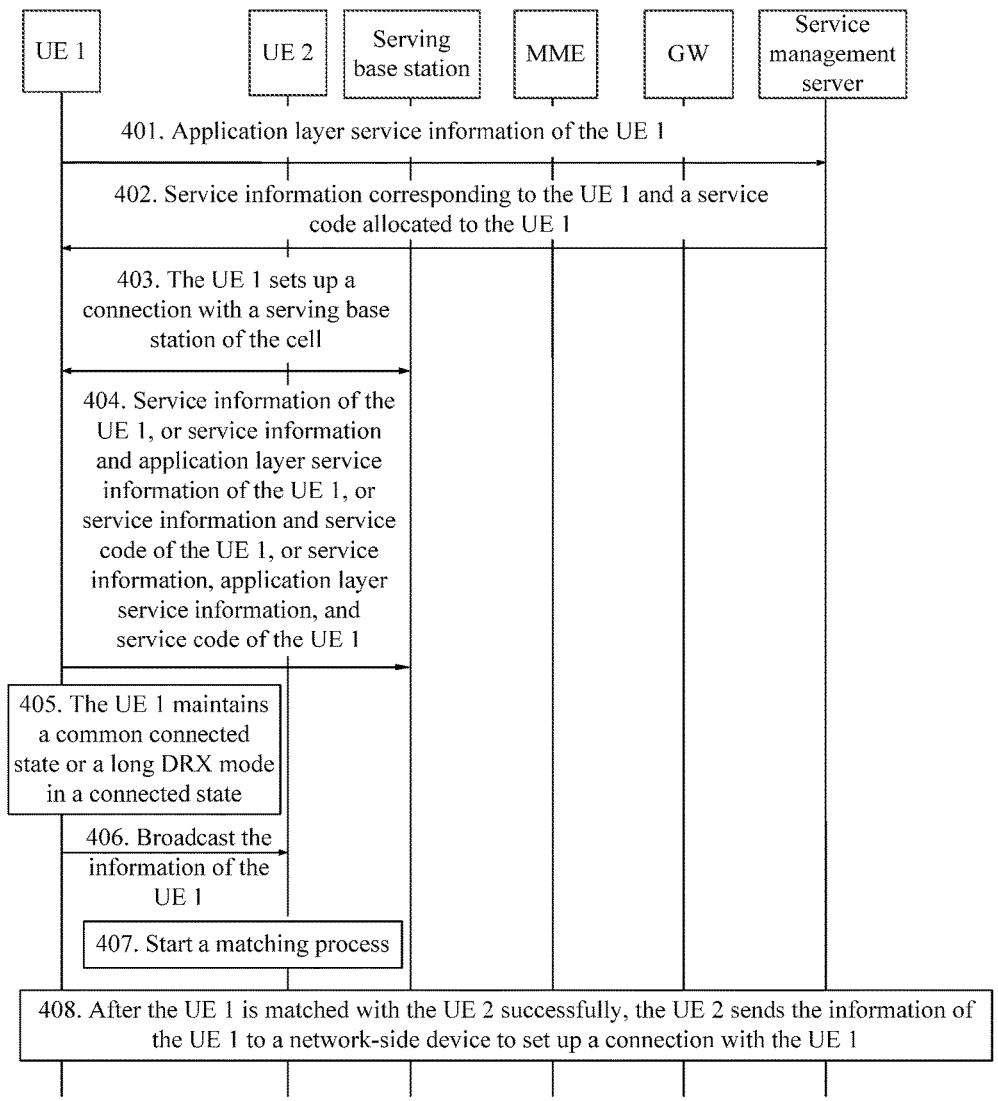
FIG. 4 is a flowchart of another embodiment of a content publishing method according to the present invention.

FIG. 4 is a flowchart of another embodiment of a content publishing method according to the present invention. As shown in FIG. 4, the content publishing method may include:

Step 401: In a process of setting up a connection with a network, a UE 1 supporting a D2D function sends application layer service information of the UE 1 to a service management server.

Specifically, when the UE 1 supporting the D2D function provides a service, the UE 1 sends application layer service information of the UE 1 to the service management server in the process of setting up a connection with the network.

The application layer service information includes service information that a user may understand. The service information that the user may understand includes a service type and/or service content. For example, the service content may be advertisement information, a video of a movie, or a game, and so on.

Step 402: The service management server finds, according to the application layer service information sent by the UE 1, service information corresponding to the UE 1, allocates a service code to the UE 1, and sends the service information corresponding to the UE 1 and the service code allocated to the UE 1 to the UE 1.

The service information may be NAS information required by the UE 1 for constructing a connection setup request message of a service, and include QoS information and so on.

In this embodiment, steps 401 and 402 are optional steps.

Step 403: When the UE 1 is handed over to a cell or powered on in a cell, the UE 1 sets up a connection with a serving base station of the cell, and triggers the serving base station to allocate a resource to the UE 1 to broadcast information of the UE 1.

In this embodiment, the serving base station may be an eNB. Definitely, the embodiment of the present invention is not limited thereto. The embodiment of the present invention does not limit the form of the serving base station.

Specifically, when the UE 1 is handed over to the cell or is powered on in the cell, the UE 1 may set up a connection with the serving base station of the cell, and obtain, from the serving base station, a resource for broadcasting information of the UE 1, no matter whether a real service of the UE 1 exists. In a specific implementation, the setting up, by the UE 1, a connection with the serving base station of the cell may be: sending, by the UE 1, an RRC connection setup message or an RRC connection setup complete message to the serving base station, where the RRC connection setup message or the RRC connection setup complete message carries an information element indicating that the UE 1 supports the D2D function, and/or a value of a setup cause information element in the RRC connection setup message is D2D connection or D2D content publishing.

Step 404: In the process of setting up a connection with the serving base station, the UE 1 sends the service information of the UE 1, or the service information and application layer service information of the UE 1, or the service information and service code of the UE 1, or the service information, application layer service information, and service code of the UE 1 to the serving base station or an evolved packet core network (Evolved Packet Core, EPC for short below) entity device.

In this embodiment, step 404 is an optional step.

Step 405: On the Uu interface, after the UE 1 sets up a connection with the serving base station, the UE 1 maintains a common connected state or a long DRX mode (long DRX mode) in a connected state.

In addition, in this embodiment, when the UE 1 leaves the cell where the serving base station is located, the UE 1 needs to notify the serving base station of recycling the resource that is allocated to the UE 1 and used for broadcasting the information of the UE 1.

Step 406: The UE 1 broadcasts the information of the UE 1 on the resource that is allocated by the serving base station to the UE 1 and used for broadcasting the information of the UE 1.

In this embodiment, the information of the UE 1 broadcast by the UE 1 may include one or a combination of an identifier, service information, a service code, and application layer service information of the UE 1.

The identifier may be: one or a combination of a physical identifier, a NAS ID, and an AS ID. For example, the physical identifier may be a specific code sequence such as an IMSI; the NAS ID may be an s-TMSI or an old GUTI; and the AS ID may be a C-RNTI or a D-RNTI (namely, an RNTI used for D2D).

The application layer service information includes service information that a user may understand. The service information that the user may understand includes a service type and/or service content. For example, the service content may be advertisement information, a video of a movie, or a game, and so on.

The service code may be a character, a character string, or a digit sequence, and may represent application layer service information.

The service information may be NAS information required by the UE 1 for constructing a connection setup request message of a service, and include QoS information and so on.

Specifically, the UE supporting the D2D function has DRX and DTX features.

Therefore, in this embodiment, the manner of broadcasting information of the UE 1 by the UE 1 may be a DTX manner: broadcasting, in a discontinuous transmission cycle (DTX-Cycle), information of the UE 1 on the resource that is allocated by the serving base station to the UE 1.

In this embodiment, after the UE 1 broadcasts the information of the UE 1, other UEs supporting the D2D function than the UE 1 in the cell where the UE 1 is located have an opportunity to detect the UE 1.

Step 407: When a UE 2 supporting the D2D function in the cell where the UE 1 is located knows, by using a sensing technology or by searching for and measuring other UEs supporting the D2D function than the UE 2 in the cell, that a possible matched UE 1 exists, a matching process is started.

Specifically, the UE 2 may search, in the DRX manner, for information broadcast by other UEs supporting the D2D function than the UE 2 in the cell where the UE 2 is located, on some specific resources, and after knowing that a possible matched UE 1 exists, the UE 2 receives information of the UE 1 broadcast by the UE 1; or the UE 2 may also receive, in an event trigger manner, information of the UE 1 broadcast by the UE 1, for example, when a user has a specific requirement, a receiving action is triggered through a man-machine interface; or an application layer triggers a receiving action according to a requirement profile (profile) previously customized by the user. Definitely, the UE 2 may also receive, by using a combination of the DRX and event trigger manners, the information of the UE 1 broadcast by the UE 1.

Step 408: After the UE 1 is matched with the UE 2 successfully, the UE 2 sends the information of the UE 1 to a network-side device to set up a connection with the UE 1.

Specifically, in an implementation manner of this embodiment, when the information of the UE 1 broadcast by the UE 1 includes service information of the UE 1, the UE 2 may generate a NAS message according to the service information of the UE 1, and send the NAS message to the network-side device to set up a connection with the UE 1.

In another implementation manner of this embodiment, if step 401 and step 402 exist, when the information broadcast by the UE 1 includes the application layer service information and/or service code of the UE 1, but does not include the service information of the UE 1, the UE 2 may send the application layer service information and/or service code of the UE 1 to the service management server, receive the service information of the UE 1 sent by the service management server according to the application layer service information and/or service code of the UE 1, generate a NAS message according to the service information of the UE 1, and send the NAS message to the network-side device to set up a connection with the UE 1.

In another implementation manner of this embodiment, if step 404 exists, when the information broadcast by the UE 1 includes the application layer service information and/or service code of the UE 1, but does not include the service information of the UE 1, the UE 2 may send the application layer service information and/or service code of the UE 1 to the serving base station or EPC entity device, receive the service information of the UE 1 sent by the serving base station or EPC entity device according to the application layer service information and/or service code of the UE 1, generate a NAS message according to the service information of the UE 1, and send the NAS message to the network-side device to set up a connection with the UE 1.

Alternatively, the UE 2 may send a connection setup request message to the serving base station, where the connection setup request message carries the application layer service information and/or service code of the UE 1, so that after receiving the connection setup request message sent by the UE 2, the serving base station obtains the service information of the UE 1 locally or from the EPC entity device according to the application layer service information and/or service code of the UE 1 carried in the connection setup request message, adds the service information of the UE 1 to the connection setup request message sent by the UE 2, and sends the connection setup request message to a core network device after the service information of the UE 1 is added.

According to the above embodiment, a matched terminal can obtain QoS information, and guaranteed services can be provided for D2D communication.

A person of ordinary skill in the art may understand that all or part of the steps in the method according to the embodiments can be implemented by hardware under the instruction of a program. The program may be stored in a computer readable storage medium and when the program runs, the steps in the method according to the embodiments are performed. The storage medium is any medium that can store program code, such as a ROM, a RAM, a magnetic disk, or an optical disc.

Figure 5:
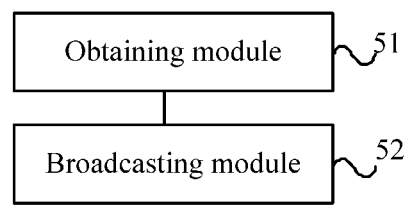
FIG. 5 is a schematic structural diagram of an embodiment of a first user equipment according to the present invention.

FIG. 5 is a schematic structural diagram of an embodiment of a first user equipment according to the present invention. The first user equipment in this embodiment may implement the procedure in the embodiment shown in FIG. 1 of the present invention, and the first user equipment supports a D2D function. As shown in FIG. 5, the first user equipment includes an obtaining module 51 and a broadcasting module 52.

The obtaining module 51 is configured to obtain a resource for broadcasting information of the first user equipment, where the information of the first user equipment includes one or a combination of an identifier, service information, a service code, and application layer service information of the first user equipment.

The identifier may be: one or a combination of a physical identifier, a NAS ID, and an AS ID. For example, the physical identifier may be a specific code sequence such as an IMSI. The NAS ID may be an s-TMSI or an old GUTI; and the AS ID may be a C-RNTI or a D-RNTI (namely, an RNTI used for D2D).

The application layer service information includes service information that a user may understand. The service information that the user may understand includes a service type and/or service content. For example, the service content may be advertisement information, a video of a movie, or a game, and so on.

The service code may be a character, a character string, or a digit sequence, and may represent application layer service information.

The service information may be NAS information required by the first user equipment for constructing a connection setup request message of a service, and include QoS information and so on.

The broadcasting module 52 is configured to broadcast the information of the first user equipment on the resource obtained by the obtaining module 51, so that a second user equipment supporting the D2D function obtains the information of the first user equipment and after being matched with the first user equipment successfully, sends the information of the first user equipment to a network-side device to set up a connection with the first user equipment. Specifically, the broadcasting module 52 may broadcast the information of the first user equipment on the obtained resource periodically in a DTX mode.

In the first user equipment, after the obtaining module 51 obtains the resource for broadcasting the information of the first user equipment, the broadcasting module 52 broadcasts the information of the first user equipment on the resource obtained by the obtaining module 51, where the information of the first user equipment includes one or a combination of an identifier, service information, a service code, and application layer service information of the first user equipment;

and then a second user equipment supporting the D2D function may obtain the information of the first user equipment and after being matched with the first user equipment successfully, send the information of the first user equipment to a network-side device to set up a connection with the first user equipment. In this way, a matched terminal can obtain QoS information, and guaranteed services can be provided for D2D communication.

Figure 6:
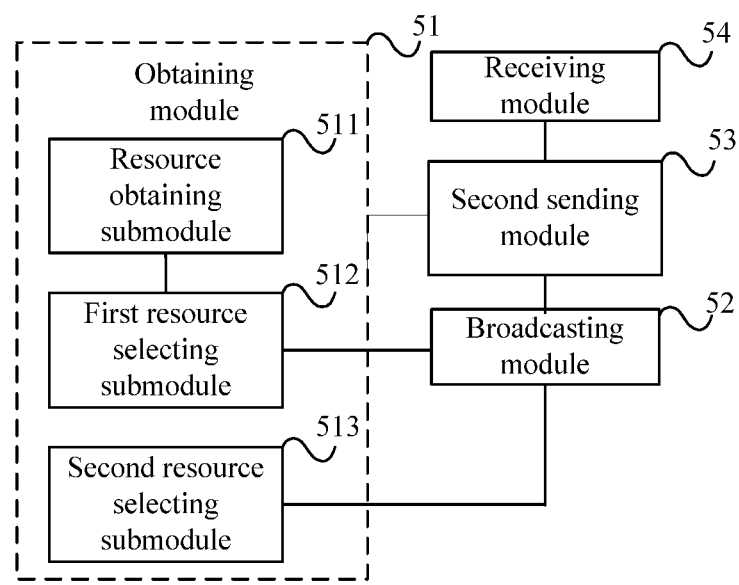
FIG. 6 is a schematic structural diagram of another embodiment of a first user equipment according to the present invention.

FIG. 6 is a schematic structural diagram of another embodiment of a first user equipment according to the present invention. Different from the first user equipment shown in FIG. 5, in the first user equipment shown in FIG. 6, the obtaining module 51 may include a resource obtaining submodule 511 and a first resource selecting submodule 512; or the obtaining module 51 may include a second resource selecting submodule 513; or the obtaining module 51 may include a resource obtaining submodule 511, a first resource selecting submodule 512, and a second resource selecting submodule 513.

The resource obtaining submodule 511 is configured to obtain resources that are allocated in advance by a serving base station of a cell where the first user equipment is currently located to user equipments supporting the D2D function in the cell and are used for broadcasting the information of the user equipments, where the resources are broadcast by the serving base station through a broadcast message.

The first resource selecting submodule 512 is configured to select, by automatic search or measurement, a resource whose interference level is lower than a predetermined threshold, from the resources allocated in advance by the serving base station.

The second resource selecting submodule 513 is configured to select, according to interference levels of sub-resources and position information of the sub-resources that are broadcast by the serving base station of the cell where the first user equipment is currently located, a sub-resource whose interference level is lower than a predetermined threshold, from the sub-resources broadcast by the serving base station, where the sub-resource is obtained after the serving base station divides resources that are allocated in advance by the serving base station to user equipments supporting the D2D function in the cell and are used for broadcasting the information of the user equipments.

In this embodiment, the first user equipment may further include other modules. A second sending module 53 is configured to send the application layer service information of the first user equipment to a service management server before the broadcasting module 52 broadcasts the information of the first user equipment. A receiving module 54 is configured to receive the service information corresponding to the first user equipment and the service code allocated by the service management server to the first user equipment. The service information is found by the service management server according to the application layer service information of the first user equipment.

With the first user equipment, a matched terminal can obtain QoS information, and guaranteed services can be provided for D2D communication.

Figure 7:
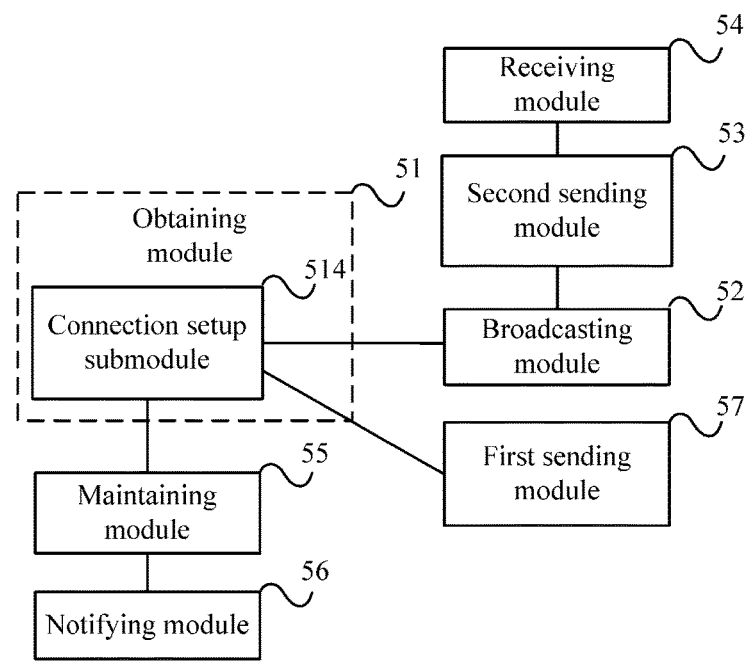
FIG. 7 is a schematic structural diagram of another embodiment of a first user equipment according to the present invention.

FIG. 7 is a schematic structural diagram of another embodiment of a first user equipment according to the present invention. Different from the first user equipment shown in FIG. 6, in the first user equipment shown in FIG. 7, the obtaining module may include a connection setup submodule 514, which is configured to set up a connection with a serving base station of a cell where the first user equipment is currently located, and trigger the serving base station to allocate a resource to the first user equipment to broadcast information of the first user equipment. Specifically, the connection setup submodule 514 may send an RRC connection setup message to the serving base station, where the RRC connection setup message carries an information element indicating that the first user equipment supports the D2D function, and/or a value of a setup cause information element in the radio resource control connection setup message is D2D connection or D2D content publishing.

Further, in this embodiment, the first user equipment may further include a number of nodules. A maintaining module 55 is configured to maintain a common connected state or a long discontinuous reception mode in a connected state after the connection setup submodule 514 sets up a connection with the serving base station of the cell where the first user equipment is currently located. A notifying module is configured to, before the first user equipment leaves the cell, notify the serving base station of recycling the resource that is allocated to the first user equipment and used for broadcasting the information of the first user equipment. A first sending module 57 is configured to, in the process of setting up a connection by the connection setup submodule 514 with the serving base station of the cell where the first user equipment is currently located, send the service information of the first user equipment, or the service information and application layer service information of the first user equipment, or the service information and service code of the first user equipment, or the service information, application layer service information, and service code of the first user equipment to the serving base station or an EPC entity device.

With the first user equipment, a matched terminal can obtain QoS information, and guaranteed services can be provided for D2D communication.

A person skilled in the art understands that the accompanying drawings show merely exemplary embodiments of the present invention and the modules or procedures in the accompanying drawings are not mandatory for the implementation of the present invention.

A person skilled in the art understands the modules of the apparatuses in the embodiments may be disposed in the apparatuses as described in the embodiments or disposed in one or more apparatuses other than the apparatuses in the embodiments. The modules according to the above embodiments may be combined into one module, or split into multiple submodules.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of the present invention.

What is claimed is:

1. A method, comprising:
  obtaining, by a first user equipment supporting a device to device (D2D) function, a plurality of resources, wherein the plurality of resources are allocated in advance by a serving base station of a cell where the first user equipment is located, the plurality of resources are allocated to user equipments supporting the D2D function in the cell, and the plurality of resources are allocated for broadcasting information about the user equipments supporting the D2D function in the cell;

selecting, by the first user equipment, a first resource of the plurality of resources for broadcasting information about the first user equipment; and broadcasting, by the first user equipment to a second user equipment supporting the D2D function, the information about the first user equipment on the first resource.

2. The method according to claim 1, wherein the plurality of resources are broadcast by the serving base station through a broadcast message.

3. The method according to claim 1, wherein an interference level of the first resource for broadcasting information about the first user equipment is lower than a predetermined threshold.

4. The method according to claim 1, wherein the information about the first user equipment comprises one or a combination of an identifier, service information, a service code, or application layer service information of the first user equipment.

5. The method according to claim 4, wherein before broadcasting the information about the first user equipment on the first resource, the method further comprises:

sending, by the first user equipment, the application layer service information of the first user equipment to a service management server, and receiving the service information corresponding to the first user equipment and the service code allocated by the service management server to the first user equipment, wherein the service information is found by the service management server according to the application layer service information of the first user equipment.

6. The method according to claim 1, wherein broadcasting the information about the first user equipment on the first resource comprises:

broadcasting, by the first user equipment in a discontinuous transmission mode, the information about the first user equipment on the first resource periodically.

7. A method, comprising:

allocating, by a base station to a first user equipment supporting a device to device (D2D) function, a first resource for broadcasting information about the first user equipment to another user equipment supporting the D2D function; and sending, by the base station, an identification of the first resource to the first user equipment, wherein the base station allocates, in advance, a plurality of resources to user equipments supporting the D2D function in a cell where the first user equipment is located, wherein the plurality of resources are used for broadcasting information about the user equipments supporting the D2D function in the cell where the first user equipment is located, and the first resource for broadcasting information about the first user equipment is selected by the first user equipment from the plurality of resources.

8. The method according to claim 7, wherein the plurality of resources are broadcast by the base station through a broadcast message.

9. The method according to claim 7, wherein an interference level of the first resource for broadcasting information about the first user equipment is lower than a predetermined threshold.

10. A device, applied to first user equipment supporting a device to device (D2D) function, the device comprising:

a processor; and a non-transitory computer readable storage medium storing a program to be executed by the processor, the program including instructions for:

obtaining a plurality of resources that are allocated in advance by a serving base station of a cell where the first user equipment is located, wherein the plurality of resources are allocated to user equipments supporting the D2D function in the cell, and the plurality of resources are allocated for broadcasting information about the user equipments supporting the D2D function in the cell; and selecting a first resource of the plurality of resources for broadcasting information about the first user equipment; and broadcasting, to a second user equipment supporting the D2D function, the information about the first user equipment on the first resource.

11. The device according to claim 10, wherein the plurality of resources are broadcast by the serving base station through a broadcast message.

12. The device according to claim 10, wherein an interference level of the first resource for broadcasting information about the first user equipment is lower than a predetermined threshold.

13. The device according to claim 10, wherein the information about the first user equipment comprises one or a combination of an identifier, service information, a service code, or application layer service information of the first user equipment.

14. The device according to claim 13, wherein the program further includes instructions for:

sending, before broadcasting the information about the first user equipment on the first resource, the application layer service information of the first user equipment to a service management server; and receiving the service information corresponding to the first user equipment and the service code allocated by the service management server to the first user equipment, wherein the service information is found by the service management server according to the application layer service information of the first user equipment.

15. The device according to claim 10, wherein broadcasting the information about the first user equipment on the first resource comprises:

broadcasting, in a discontinuous transmission mode, the information about the first user equipment on the first resource periodically.

16. A device applied to a base station, the device comprising:

a processor; and a non-transitory computer readable storage medium storing a program to be executed by the processor, the program including instructions for:

allocating, to a first user equipment supporting a device to device (D2D) function, a first resource that is used for broadcasting information about the first user equipment to another user equipment supporting the D2D function; and sending an identification of the first resource to the first user equipment, wherein the base station is configured to allocate, in advance, a plurality of resources to user equipments supporting the D2D function in a cell where the first user equipment is located, wherein the plurality of resources are allocated for broadcasting information about the user equipments supporting the D2D function in the cell where the first user equipment is located, and the first resource for broadcasting information about the first user equipment is selected by the first user equipment from the plurality of resources.

17. The device according to claim 16, wherein the plurality of resources are broadcast by the base station through a broadcast message.

18. The device according to claim 16, wherein an interference level of the first resource for broadcasting information about the first user equipment is lower than a predetermined threshold.

* * * * *